US009826168B2

(12) United States Patent  
Hashiguchi et al.

(10) Patent No.: US 9,826,168 B2  
(45) Date of Patent: Nov. 21, 2017

(54) VIDEO SWITCHING DEVICE

(71) Applicant: Nihon Video System Co., Ltd., Tsushima-shi, Aichi (JP)

(72) Inventors: Kentaro Hashiguchi, Tsushima (JP); Hidetake Sugita, Tsushima (JP)

(73) Assignee: Nihon Video System Co., Ltd., Tsushima-shi, Aichi (JP)

(*) Notice: Subject to any disclaimer, the term of this patent is extended or adjusted under 35 U.S.C. 154(b) by 0 days.

(21) Appl. No.: 15/165,911

(22) Filed: May 26, 2016

(65) Prior Publication Data

US 2016/0360142 A1 Dec. 8, 2016

(30) Foreign Application Priority Data

Jun. 3, 2015 (JP) .................................. 2015-113360

(51) Int. Cl.
*H04N 5/232* (2006.01)
*H04N 5/268* (2006.01)
*H04N 5/247* (2006.01)

(52) U.S. Cl.
CPC ......... *H04N 5/23293* (2013.01); *H04N 5/232* (2013.01); *H04N 5/23296* (2013.01); *H04N 5/268* (2013.01); *H04N 5/247* (2013.01)

(58) Field of Classification Search
CPC ............... H04N 5/23293; H04N 5/268; H04N 5/23203; H04N 5/23296; H04N 5/247
See application file for complete search history.

(56) References Cited

U.S. PATENT DOCUMENTS

2009/0051765 A1* 2/2009 Moberly ............. G06F 19/3418
348/77

2011/0019102 A1* 1/2011 Katsuya ............... G11B 27/002
348/725

(Continued)

FOREIGN PATENT DOCUMENTS

JP 10-327341 A 12/1998
JP 2011-223541 A 11/2011

OTHER PUBLICATIONS

Japanese Office Action dated Oct. 13, 2015, issued in corresponding Japanese Application No. 2015-113360, filed Jun. 3, 2015, 6 pages.

(Continued)

*Primary Examiner* — Hung Lam
(74) *Attorney, Agent, or Firm* — Christensen O'Connor Johnson Kindness; Llewellyn Lawson; Andrew Laughlin

(57) ABSTRACT

A video switching device is provided that has a function as a video switcher and a function as an adaptor to display a return video. According to the present invention, a video switching device is provided that includes: a first video signal input unit to receive input of a first video signal; a second video signal input unit to receive input of a second video signal; a video switching switch to generate a video switching signal; a video switching unit to switch an output video signal generated from the first and second video signals between a first output video signal and a second output video signal based on a state of the video switching signal; and a mode selection unit to select whether the video switching unit operates in a switcher mode or a return video display mode, wherein the video switching unit is configured to switch the output video signal between the first output video signal and the second output video signal every time the video switching switch is operated in the switcher mode and, in the return video display mode, configured to output the first output video signal as the output video signal while the video switching switch is not operated and to output the second output video signal as the output video signal while the video switching switch is operated.

3 Claims, 7 Drawing Sheets

(56) References Cited

U.S. PATENT DOCUMENTS

| | | | |
|---|---|---|---|
| 2011/0181766 A1 | 7/2011 | Hashiguchi | |
| 2012/0144409 A1* | 6/2012 | Pham | H04H 60/31 725/13 |
| 2013/0050581 A1* | 2/2013 | Deshpande | H04N 5/247 348/705 |
| 2013/0081090 A1* | 3/2013 | Lin | H04N 21/4126 725/62 |
| 2013/0107099 A1 | 5/2013 | Hashiguchi | |
| 2014/0375889 A1* | 12/2014 | Cho | H04N 5/268 348/706 |
| 2015/0058709 A1* | 2/2015 | Zaletel | H04L 65/608 715/202 |

OTHER PUBLICATIONS

"VSE-200: Compact Live Switcher," Protech, Nippon Video System Co., Ltd., <http://www.protechweb.jp/products/switcher/vse200/index.html> [retrieved May 23, 2016], 2 pages.

Written Explanation for Accelerated Examination, filed Jul. 17, 2015, in corresponding Japanese Application No. 2015-113360, filed Jun. 3, 2015, 2 pages.

* cited by examiner

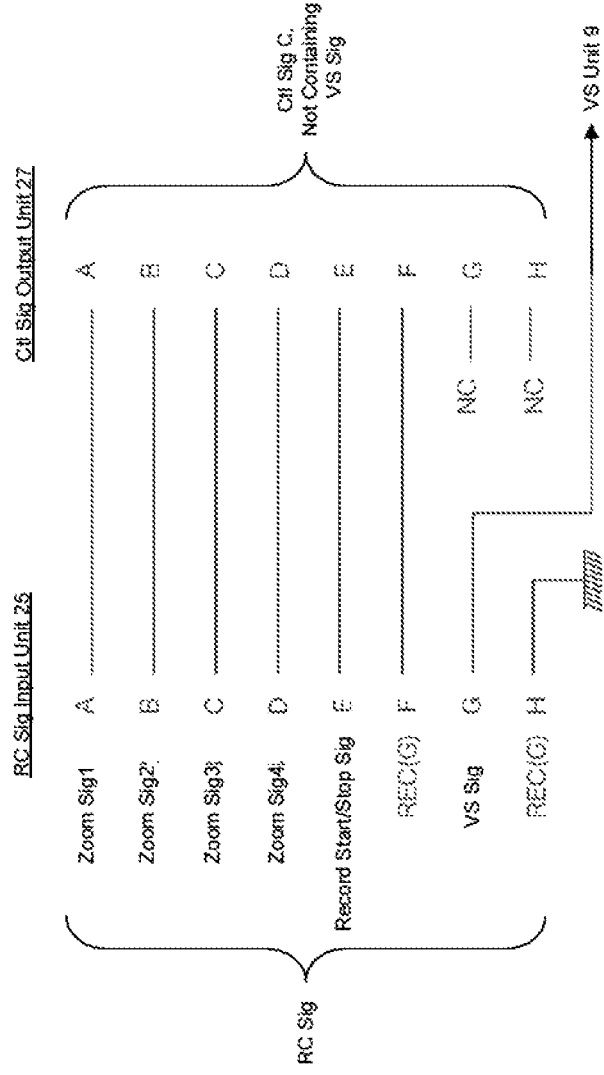

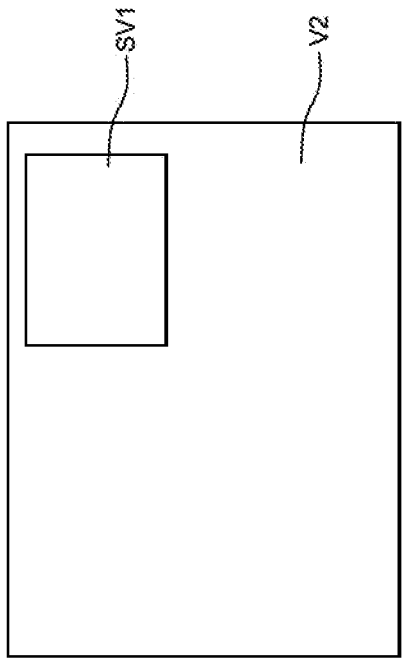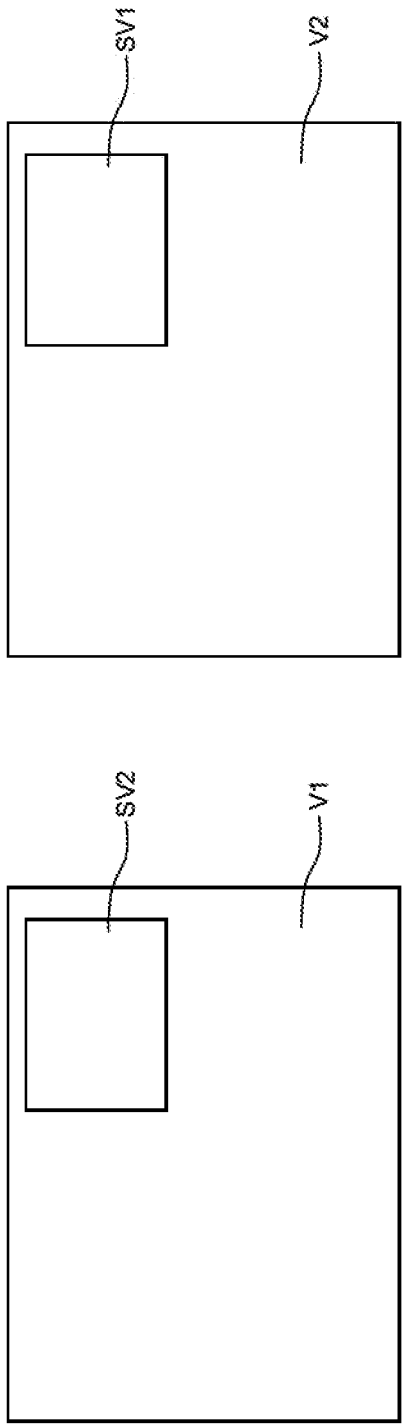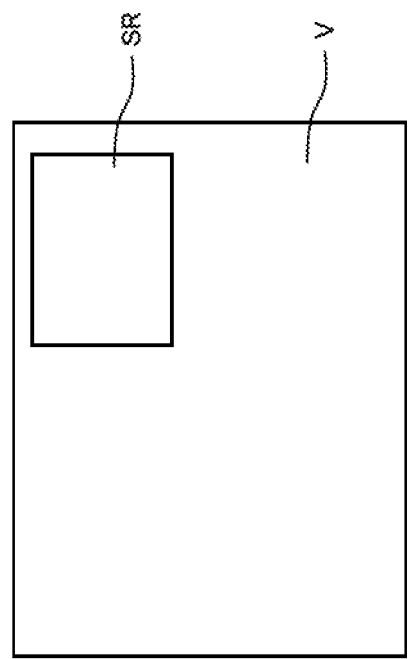

VIDEO SWITCHING DEVICE

TECHNICAL FIELD

The present invention relates to a video switching device that has a function as a video switcher and a function as an adaptor to display a return video

BACKGROUND ART

To switch videos on site using two video cameras, a video switcher is used. A viewfinder of a general video camera is capable of switching between a video taken by a cameraman and a return video from a switcher for display by pressing a return video display switch of a lens mounted on the camera body.

SUMMARY OF THE INVENTION

Technical Problem

Since viewfinders are designed dedicatedly for each camera or dedicatedly for each camera manufacturer (connectors are also dedicated), they are not compatible with products by other manufacturers. Quite a few cameramen do not have a personal camera, so that the model of camera often differs dependent on the video recording site. The viewfinders and the monitors for taking videos are also often manufactured by a third party. A viewfinder for taking videos is, therefore, not capable of displaying a return video, and out of necessity, videos are sometimes taken while a return video is checked by outputting it at all times to another monitor separate from the viewfinder (monitor) for taking videos.

Video cameras become available at lower prices with higher video quality, and there is a demand for an inexpensive video switcher system.

The present invention has been made in view of such circumstances and is to provide a video switching device that has a function as a video switcher and a function as an adaptor to display a return video.

Solution to Problem

According to the present invention, a video switching device is provided that includes: a first video signal input unit to receive input of a first video signal; a second video signal input unit to receive input of a second video signal; a video switching switch to generate a video switching signal; a video switching unit to switch an output video signal generated from the first and second video signals between a first output video signal and a second output video signal based on a state of the video switching signal; and a mode selection unit to select whether the video switching unit operates in a switcher mode or a return video display mode, wherein the video switching unit is configured to switch the output video signal between the first output video signal and the second output video signal every time the video switching switch is operated in the switcher mode and, in the return video display mode, configured to the first output video signal as the output video signal while the video switching switch is not operated and to output the second output video signal as the output video signal while the video switching switch is operated.

The video switching device of the present invention is characterized by having two operation modes of a switcher mode and a return video display mode. It is possible to input two video signals to the video switching device, and based on an operation of the video switching switch (press of the switch for a press button switch, and movement of the lever for a toggle switch), the output video signal is switched between the first output video signal and the second output video signal.

In the switcher mode, the video switching device of the present invention functions as a video switcher that switches videos from two video cameras for output. In this mode, as illustrated in FIG. 1, first and second video camera video signals from two video cameras are input to the video switching device, and the output video signal is switched between the first output video signal and the second output video signal every time the video switching switch is operated. Input of the output video signal from the video switching device to a recorder, therefore, enables recording of a video obtained by switching two videos from two video cameras in accordance with the timing when the video switching switch is operated.

In the return video display mode, the video switching device of the present invention functions as an adaptor to allow a return video from the video switcher to be displayed on a display device (a viewfinder or a monitor) without using an dedicated CCU. In this mode, a video camera video signal from one video camera and a return video signal from the video switcher are input to the video switching device, and the output video signal is switched from the first output video signal to the second output video signal only while the video switching switch is operated. Simple removal of a finger from the video switching switch, therefore, enables return of the output video signal from the second output video signal to the first output video signal, and this is excellent in operability.

As just described, the video switching switch of the present invention operates differently when the video switching switch is operated in the switcher mode from the return video display mode. It is thus possible to utilize the video switching device as a video switcher in the switcher mode and as an adaptor to display a return video in the return video display mode.

Various embodiments below exemplify the present invention. The following embodiments may be combined with each other.

It is preferred that the video switching switch is provided in the video switching device or provided in a remote controller connected to the video switching device.

It is preferred that the device further includes a zoom remote controller for a video camera connected to the video switching device, wherein the zoom remote controller is configured to generate a remote control signal containing the video switching signal, and the video switching device includes a remote control signal input unit to receive input of the remote control signal and a control signal output unit to output a control signal obtained by removing the video switching signal from the remote control signal.

BRIEF DESCRIPTION OF THE DRAWINGS

FIG. 5 illustrates an example of a circuit to output a control signal C obtained by removing a video switching signal from a remote control signal.

FIG. 6A illustrates a video in which part of a video V1 by a first video camera video signal is replaced by a video SV2 obtained by reducing a video by a second video camera video signal and FIG. 6B illustrates a video in which part of a video V2 by a second video camera video signal is replaced by a video SV1 obtained by reducing a video by a first video camera video signal.

FIG. 7 illustrates a video in which part of a video V by a video camera video signal is replaced by a video SR obtained by reducing a return video by a return video signal.

DESCRIPTION OF EMBODIMENT

An embodiment of the present invention is described below with reference to the drawings. Various characteristics in the embodiment described below may be combined with each other. Respective characteristics are independently inventive.

Figure 1:
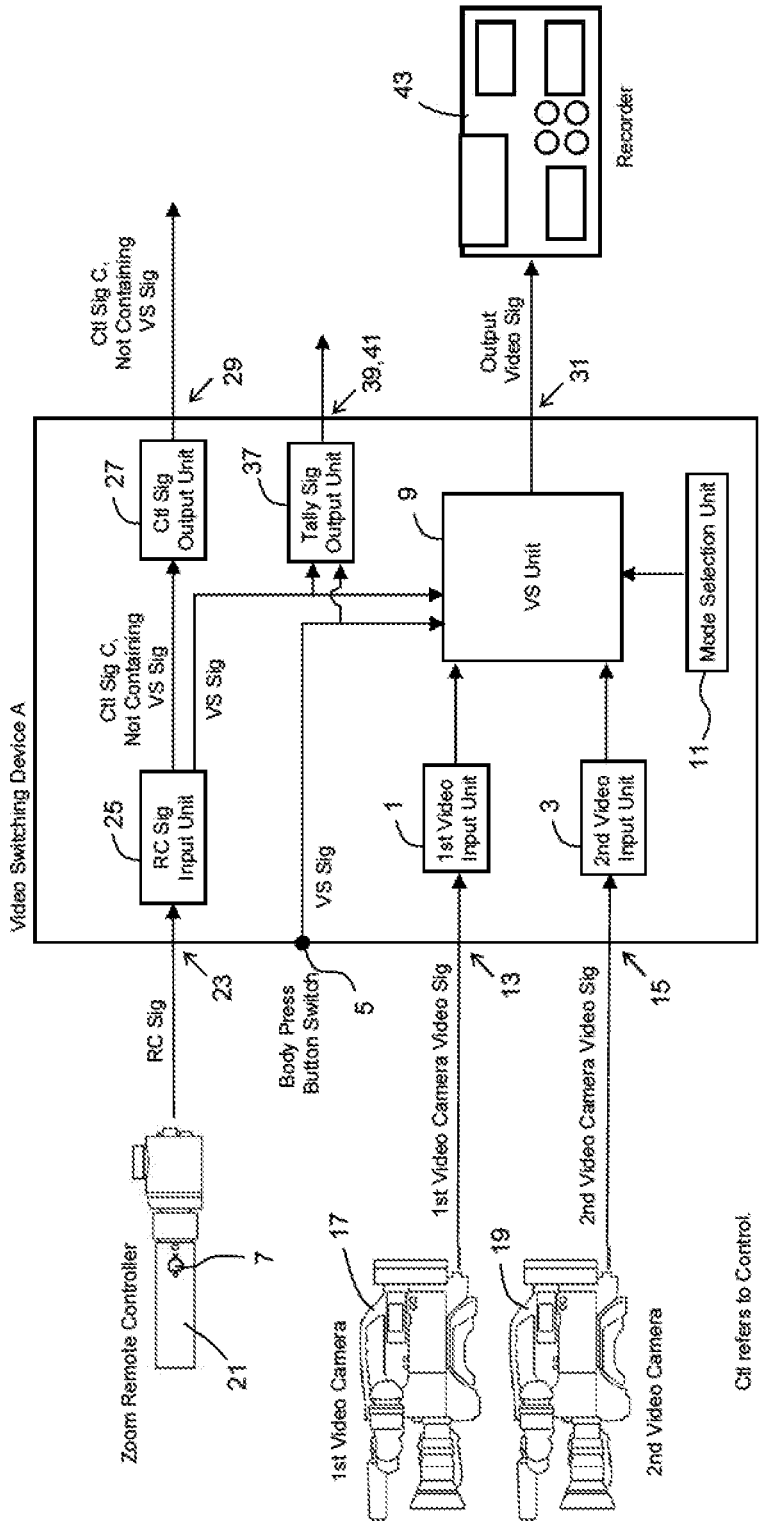
FIG. 1 is a connection diagram illustrating use of a video switching device A in a switcher mode based on an embodiment of the present invention.

As illustrated in FIG. 1, a video switching device A includes: a first video signal input unit 1 to receive input of a first video signal; a second video signal input unit 3 to receive input of a second video signal; a video switching switch to generate a video switching signal; a video switching unit 9 to switch an output video signal generated from the first video signal and the second video signal between a first output video signal and a second output video signal based on a state of the video switching signal; and a mode selection unit to select whether the video switching unit 9 operates in a switcher mode or a return video display mode, wherein the video switching unit 9 is configured to switch the output video signal between the first output video signal and the second output video signal every time the video switching switch is operated in the switcher mode and, in the return video display mode, configured to output the first output video signal as the output video signal while the video switching switch is not operated and to output the second output video signal as the output video signal while the video switching switch is operated.

The video switching device A can be turned on/off by operating a power supply switch 51 provided in a body 10.

Figure 3:
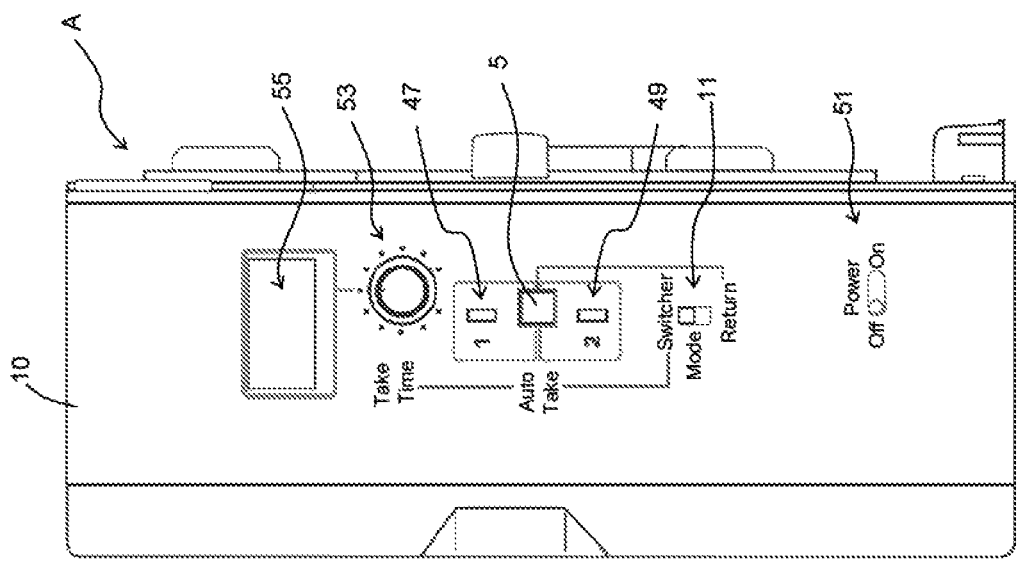
FIG. 3 is a front view of the video switching device A based on an embodiment of the present invention.
Figure 4:
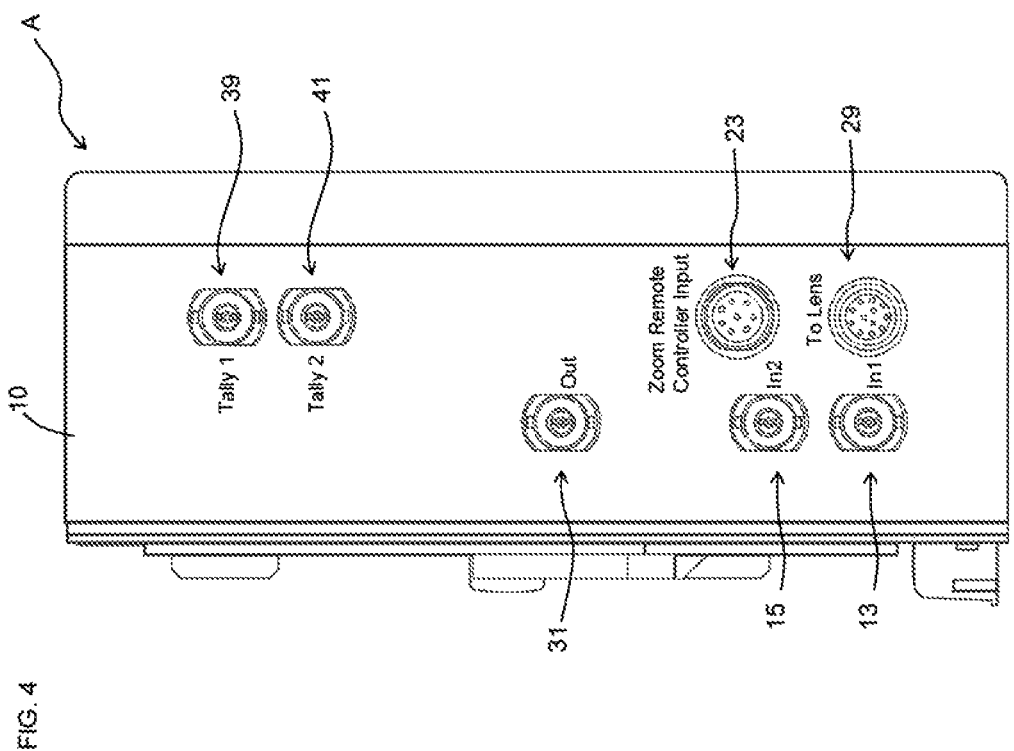
FIG. 4 is a rear view of the video switching device A based on an embodiment of the present invention.

In the present embodiment, as illustrated in FIG. 3, the mode selection unit is a knob shaped selector switch 11 provided in the body 10. Movement of a knob of the switch 11 enables switching of the mode between the switcher mode and the return video display mode.

As illustrated in FIG. 1, the box shaped body 10 of the video switching device A is provided with input terminals (e.g., BNC terminals) 13 and 15 to input the first and second video signals. In the switcher mode illustrated in FIG. 1, first and second video cameras 17 and 19 have output terminals connected to an end of cables with the other end connected to the input terminals 13 and 15, thereby enabling input of first and second video camera video signals output from the first and second video cameras 17 and 19 to the first and second video signal input units 1 and 3. In the return video display mode illustrated in FIG. 2, a video camera 33 has an output terminal connected to an end of a cable with the other end connected to the input terminal 13, thereby enabling input of a video camera video signal output from the video camera 33 to the first video signal input unit 1. A video switcher 35 has a return video signal output terminal connected to an end of a cable with the other end connected to the input terminal 15, thereby enabling input of a return video signal output from the video switcher 35 to the second video signal input unit 3. The type of video signal herein is not limited, and the type of signal may be composed based on a video camera signal, such as a composite signal, an HD-SDI signal, an SD-SDI signal, and an HD component.

As illustrated in FIG. 3, the body 10 is provided with LED indicators 47 and 49, which are lit when the video signals are input to the first and second video signal input units 1 and 3.

Figure 9:
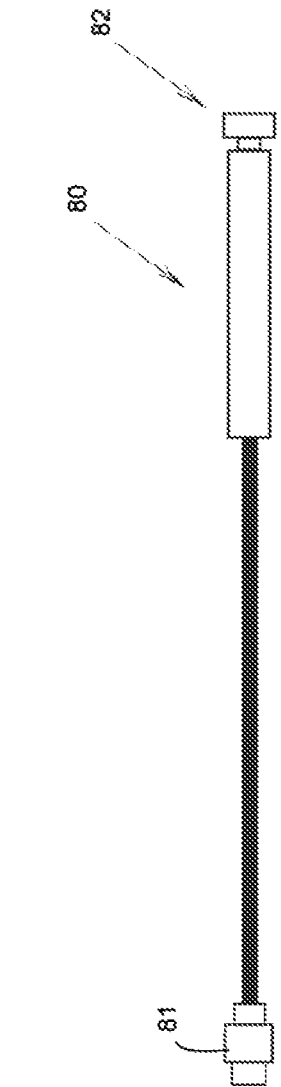
FIG. 9 is a front view of a pen shaped switch remote controller 80.

The box shaped body 10 of the video switching device A is provided with an input terminal 23 to connect a zoom remote controller 21 for a video camera lens. The zoom remote controller 21 is configured to generate a remote control signal containing a video switching signal. The zoom remote controller 21 is, for example, a zoom remote controller for camera AS-1 manufactured by Nippon Video System, Co., Ltd. The zoom remote controller 21 is provided with, for example, a return video display button, a record start/stop button, and a zoom lever, and in this case, the remote control signal output by the zoom remote controller 21 contains a record start/stop signal and a zoom signal in addition to the video switching signal (return video display signal). The input terminal 23 may be connected to a remote controller that has a return video display button only. Examples of such remote controller include a pen shaped switch remote controller 80 as illustrated in FIG. 9. The remote controller 80 is capable of generating a video switching signal by connecting an output terminal 81 to the input terminal 23 and pressing a switch 82.

The video switching device A includes a remote control signal input unit 25 to receive input of the remote control signal and a control signal output unit 27 to output a control signal C obtained by removing the video switching signal from the remote control signal. The control signal C is output from a control signal output terminal 29. An example of a circuit to output the control signal C obtained by removing the video switching signal from the remote control signal is as illustrated in FIG. 5. In the switcher mode, the control signal C is not used generally and the control signal output terminal 29 is not connected to anything at all. In the return video display mode, the control signal C is input to the video camera 33. This enables start/stop of recording, zoom adjustment, and the like of the video camera 33. Some video cameras 33 are designed to output a video recorded immediately before by the video camera 33 (hereinafter, referred to as "a last recorded video") when a video switching signal is input. Therefore, to prevent the video camera 33 from outputting the last recorded video, the control signal C, which does not contain the video switching signal, is input to the video camera 33.

In the present embodiment, as the video switching switch, a press button switch 5 in the body 10 and a press button switch (return video display button) 7 in the zoom remote controller 21 are provided. In either case of pressing the press button switch 5 or 7, only while the switch is pressed, the state of the video switching signal is switched from L (low) to H (high) or from H to L, and the change of state is input to the video switching unit 9 and a tally signal output unit 37. The tally signal output unit 37 outputs a tally signal from tally signal output terminals 39 and 41 based on the state of the video switching signal.

The operation of the video switching unit 9 is further described below using an example where the video switching signal is at L while the press button switch 5 or 7 is not pressed and the video switching signal changes to H only while the press button switch 5 or 7 is pressed.

In the switcher mode illustrated in FIG. 1, in the state where the press button switch 5 or 7 is not pressed, the video selection unit 9 outputs a first video camera video signal input to the first video input unit 1 as an output video signal from a video output terminal 31. In the present embodiment, the video output terminal 31 is connected to an end of a cable with the other end connected to a recorder 43, so that the output video signal composed of the first video camera video signal (first output video signal) is input to the recorder 43.

Then, when the press button switch 5 or 7 is pressed by a finger, the video switching signal changes from L to H and the video switching unit 9 detects this change to switch the output video signal to the second video camera video signal. From this point, the recorder 43 starts recording of the output video signal composed of the second video camera video signal (second output video signal).

When the finger is removed from the press button switch 5 or 7, the video switching signal changes from H to L while the video switching unit 9 continues to output the second video camera video signal. The transition time for switching the output video signal can be adjusted using an adjustment volume 53 provided in the body 10. The transition time is displayed on a display unit 55 provided in the body 10. Here, instead of switching the output video signal to the second video camera video signal, the video switching unit 9 may output, as illustrated in FIG. 6A for example, a video signal corresponding to a video in which part of a video V1 by the first video camera video signal is replaced by a video SV2 obtained by reducing a video by the second video camera video signal as the output video signal (second output video signal).

Then, when the press button switch 5 or 7 is pressed by a finger, the video switching signal changes from L to H, and the video switching unit 9 detects this change to switch the output video signal to the first video camera video signal. From this point, the recorder 43 starts recording of the output video signal composed of the first video camera video signal (first output video signal). When the finger is removed from the press button switch 5 or 7, the video switching signal changes from H to L while the video switching unit 9 continues to output the first video camera video signal. Here, instead of switching the output video signal to the first video camera video signal, the video switching unit 9 may output, as illustrated in FIG. 6B for example, a video signal corresponding to a video in which part of a video V2 by the second video camera video signal is replaced by a video SV1 obtained by reducing a video by the first video camera video signal as the output video signal (first output video signal).

As just described, in the switcher mode, the video switching unit 9 switches the output video signal between the first output video signal and the second output video signal every time the press button switch 5 or 7 is pressed. In the switcher mode, it is inconvenient to have the output video signal switched by removing a finger from the press button switch 5 or 7. The video switching unit 9 is therefore designed not to switch the output video signal by removing a finger from the press button switch 5 or 7.

Figure 2:
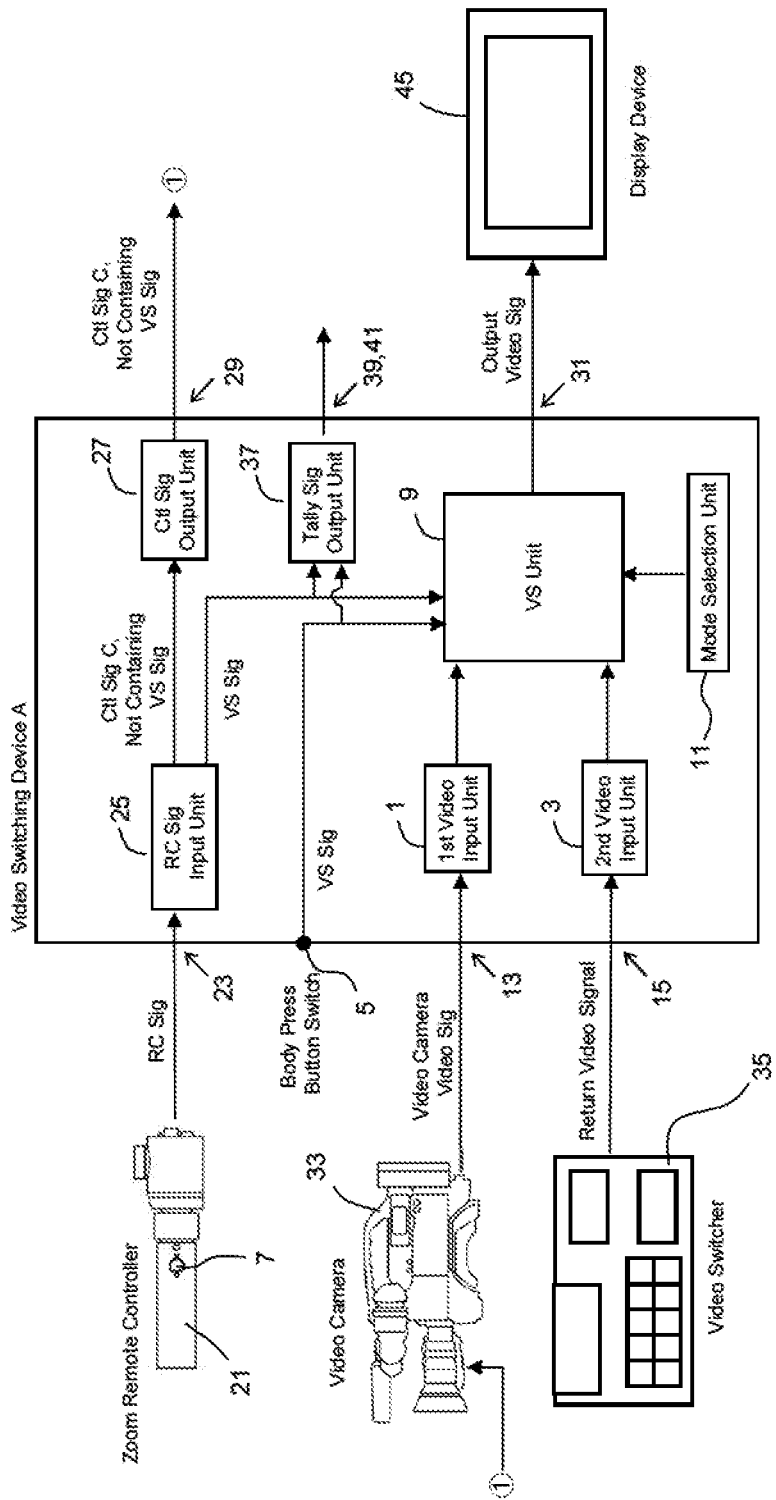
FIG. 2 is a connection diagram illustrating use of the video switching device A in a return video display mode based on an embodiment of the present invention.

In the return video display mode illustrated in FIG. 2, in the state where the press button switch 5 or 7 is not pressed, the video selection unit 9 outputs the video camera video signal input to the first video input unit 1 as the output video signal (first output video signal) from the video output terminal 31. In the present embodiment, the video output terminal 31 is connected to an end of a cable with the other end connected to a display device 45. The output video signal composed of the video camera video signal is thus input to the display device 45 to be displayed. The display device 45 is assumed to be used by a cameraman taking videos using the video camera 33 to view the video being taken by him/herself (video camera video) or a return video from the video switcher 35 and is arranged adjacent to the video camera 33. Examples of the display device 45 include the viewfinder mounted on the video camera 33 and a monitor arranged adjacent to the video camera 33. The return video is a video currently employed by the video switcher 35, and checking the return video allows a cameraman to spontaneously determine what video he/she should take to create an interesting TV program.

Then, when the press button switch 5 or 7 is pressed by a finger, the video switching signal changes from L to H, and the video switching unit 9 detects this change to switch the output video signal to the return video signal (second output video signal). From this point, the display device 45 starts display of a return video corresponding to the return video signal. Here, instead of switching the output video signal to the return video signal, the video switching unit 9 may output, as illustrated in FIG. 7 for example, a video signal corresponding to a video in which part of a video V by a video camera video signal is replaced by a video SR obtained by reducing a return video by the return video signal as the output video signal (second output video signal).

When the finger is removed from the press button switch 5 or 7, the video switching signal changes from H to L and the video switching unit 9 switches the output video signal to the video camera video signal.

As just described, in the return video display mode, the video switching unit 9 displays a return video only while the press button switch 5 or 7 is pressed. Even in the switcher mode, a return video can be displayed by pressing the press button switch 5 or 7, however in such a case, the return video remains displayed even after the finger is removed from the press button switch 5 or 7. Then, not to display the return video, the press button switch 5 or 7 has to be pressed again and this is bothering. Meanwhile, in the return video display mode, the return video is not displayed only by removing the finger from the press button switch 5 or 7 and this is excellent in operability.

Figure 8:
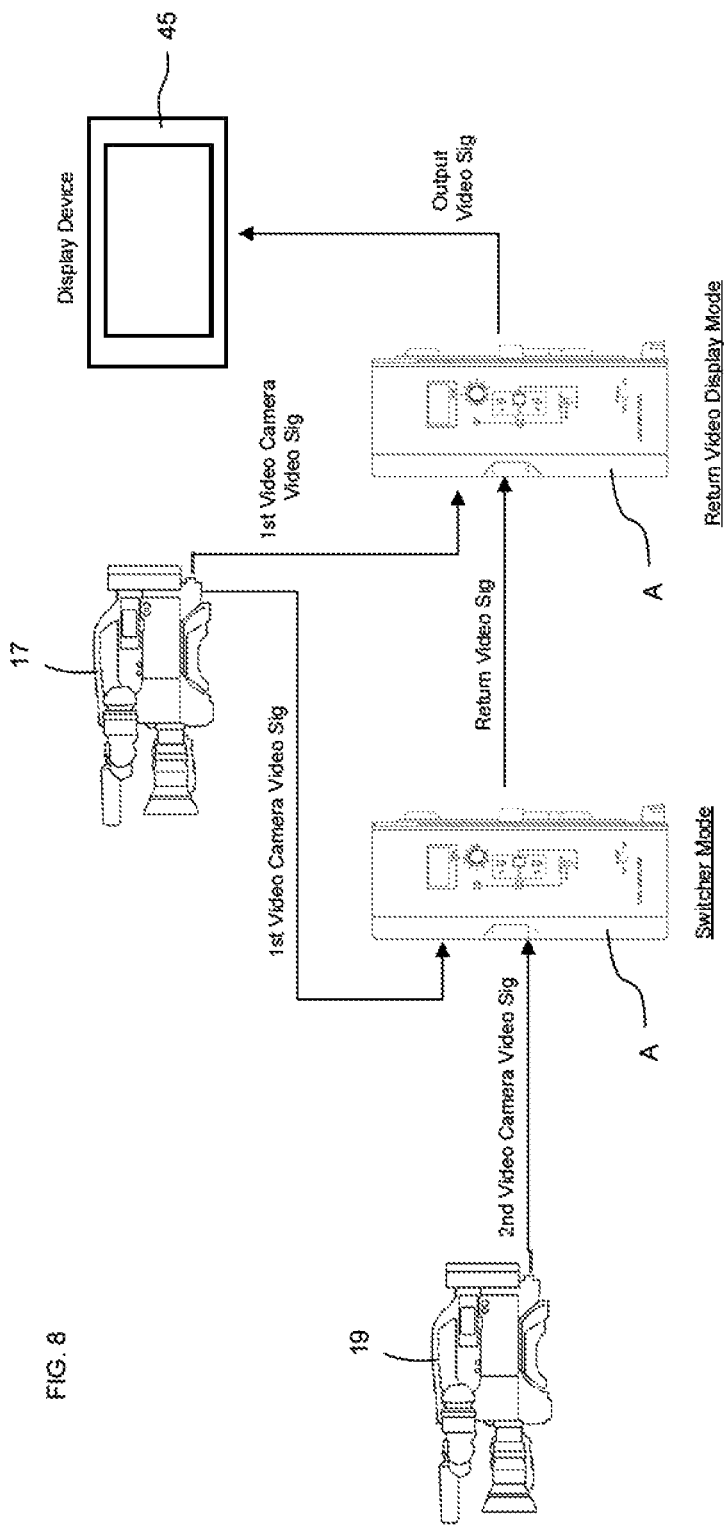
FIG. 8 is a connection diagram illustrating an example of constructing a video switcher system using two video switching devices A.

As described above, the video switching device A in the present embodiment, may be utilized as a video switcher and may be utilized as an adaptor to display a return video in a return video display mode. It is therefore possible to construct a video switcher system by preparing two video switching devices A of the present embodiment to set one in a switcher mode and another in a return video display mode and wiring as illustrated in FIG. 8. In this system, no expensive video switcher has to be prepared separately and no dedicated CCU has to be used to display a return video. It is accordingly possible to construct a video switcher system readily and inexpensively regardless of the type of video camera used on site.

What is claimed is:

1. A video switching device, comprising: a first video signal input to receive input of a first video signal; a second video signal input to receive input of a second video signal; a video switching switch to generate a video switching signal; a video switch to switch an output video signal generated from the first and second video signals between a first output video signal and a second output video signal based on a state of the video switching signal; and a mode selector to select whether the video switch operates in a switcher mode or a return video display mode, wherein
- the video switch is configured to switch the output video signal between the first output video signal and the second output video signal every time the video switching switch is operated in the switcher mode and, in the return video display mode, configured to output the first output video signal as the output video signal while the video switching switch is not operated and to output the second output video signal as the output video signal only while the video switching switch is operated.

2. The video switching device according to claim 1, wherein the video switching switch is provided in the video switching device or provided in a remote controller connected to the video switching device.

3. The video switching device according to claim 1, further comprising
- a zoom remote controller for a video camera connected to the video switching device, wherein
- the zoom remote controller is configured to generate a remote control signal containing the video switching signal, and
- the video switching device includes a remote control signal input to receive input of the remote control signal and a control signal output to output a control signal obtained by removing the video switching signal from the remote control signal.

* * * * *